(12) United States Patent
Herndon et al.

(10) Patent No.: US 8,956,432 B2
(45) Date of Patent: *Feb. 17, 2015

(54) REUSABLE AFTERMARKET PARTICULATE COLLECTION MEMBER FOR OTHERWISE CONVENTIONAL CONSUMER FLOOR VACUUM CLEANERS

(75) Inventors: Robert Mark Herndon, Grove, PA (US); Lucy Herndon, Grove, PA (US); Ernest J. Zavoral, Sr., Canfield, OH (US)

(73) Assignee: Retro Filters LLC, Austintown, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/340,975

(22) Filed: Dec. 30, 2011

(65) Prior Publication Data

US 2012/0151705 A1    Jun. 21, 2012

Related U.S. Application Data

(63) Continuation-in-part of application No. 12/818,457, filed on Jun. 18, 2010, now abandoned.

(51) Int. Cl.
*B01D 46/02* (2006.01)
*A47L 9/14* (2006.01)
*A47L 7/00* (2006.01)
*A47L 9/12* (2006.01)

(52) U.S. Cl.
CPC .............. *A47L 9/149* (2013.01); *A47L 7/0004* (2013.01); *A47L 9/127* (2013.01); *A47L 9/1445* (2013.01); *B01D 46/02* (2013.01); *B01D 2279/55* (2013.01); *Y10S 55/02* (2013.01); *Y10S 55/03* (2013.01)
USPC ................... 55/367; 55/372; 55/374; 55/376; 55/378; 55/DIG. 2; 55/DIG. 3; 15/347

(58) Field of Classification Search
USPC ................... 15/358, 376, 318, 373, 347, 367, 15/DIG. 2, DIG. 3, 315, 352, 353; 134/21
See application file for complete search history.

(56) References Cited

U.S. PATENT DOCUMENTS

| 4,229,193 | A | 10/1980 | Miller |
| 5,690,710 | A | 11/1997 | Stephan |
| 6,033,451 | A * | 3/2000 | Fish et al. ........................ 55/374 |
| 6,156,086 | A | 12/2000 | Zhang |
| 6,461,394 | B1 * | 10/2002 | Mattsson ........................ 55/374 |
| 6,565,637 | B2 | 5/2003 | Alberts, III et al. |
| 6,726,884 | B1 | 4/2004 | Dillon et al. |
| 6,786,947 | B2 * | 9/2004 | Mountford ........................ 55/367 |

(Continued)

*Primary Examiner* — Duane Smith
*Assistant Examiner* — Minh-Chau Pham
(74) *Attorney, Agent, or Firm* — John D. Gugliotta

(57) ABSTRACT

A reusable aftermarket particulate collection member for use with an otherwise conventional floor vacuum cleaner. The collection member is formed of a size, shape and configuration as to be an aftermarket replacement for a conventional, disposable paper type vacuum filter bags used with said conventional vacuum cleaners. An open end is formed on the collection member, and the collection member is further formed of a woven and/or nonwoven fabric. Said member having a slip clamp fastener arrangement for sealing the open end during use, but for allowing said opening to permit egress of collected contents. An entry portal formed within a sidewall of said collection member is circumscribed by a rigid mounting plate adapted to allow for securement to a hose inlet.

6 Claims, 14 Drawing Sheets

(56) References Cited

U.S. PATENT DOCUMENTS

| | | | |
|---|---|---|---|
| 6,802,879 B2 * | 10/2004 | Scanlon | 55/367 |
| 7,341,612 B2 | 3/2008 | Nhan et al. | |
| 7,627,928 B2 | 12/2009 | Crevling, Jr. et al. | |
| 2002/0166449 A1 * | 11/2002 | Scanlon | 95/273 |
| 2005/0132676 A1 * | 6/2005 | Nhan et al. | 55/374 |
| 2006/0064951 A1 * | 3/2006 | Stein et al. | 55/373 |
| 2008/0196366 A1 | 8/2008 | Conrad | |
| 2008/0196745 A1 | 8/2008 | Conrad | |
| 2008/0302070 A1 | 12/2008 | Castronovo | |
| 2009/0120048 A1 * | 5/2009 | Wertz et al. | 55/521 |
| 2009/0242469 A1 | 10/2009 | Calabrese | |
| 2010/0071151 A1 | 3/2010 | Crevling, Jr. et al. | |
| 2010/0218470 A1 * | 9/2010 | Schultink et al. | 55/382 |
| 2011/0061540 A1 * | 3/2011 | Sepke | 96/222 |
| 2011/0147976 A1 * | 6/2011 | Wertz et al. | 264/101 |

* cited by examiner

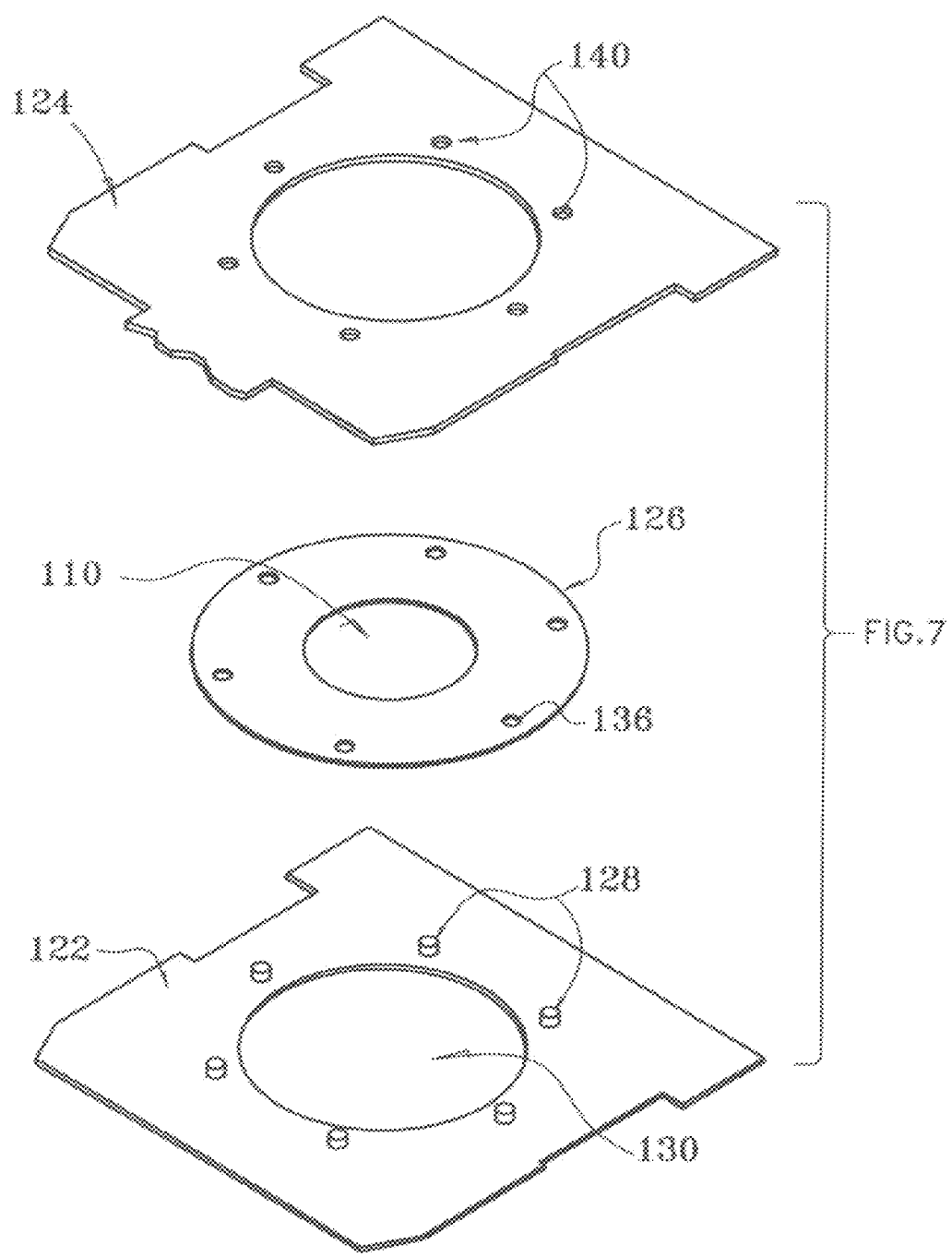

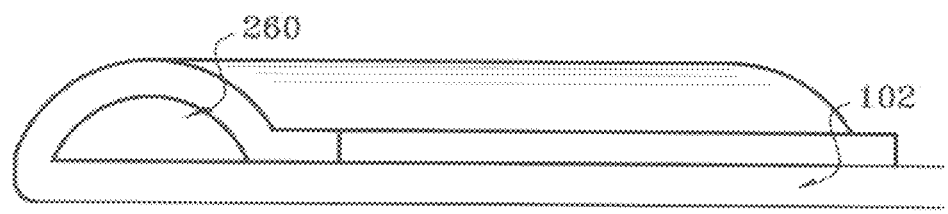
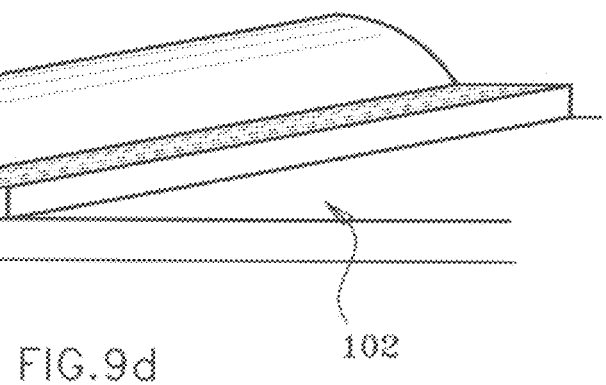

REUSABLE AFTERMARKET PARTICULATE COLLECTION MEMBER FOR OTHERWISE CONVENTIONAL CONSUMER FLOOR VACUUM CLEANERS

RELATED APPLICATIONS

The present invention is a Continuation in Part of U.S. Ser. No. 12/818,457 filed on 18 Jun. 2010 now abandoned. There are no other previously filed, nor any co-pending applications, anywhere in the world.

BACKGROUND OF THE INVENTION

1. Field of the Invention

The present invention relates generally to improvements in vacuum cleaner particulate collection bags and filters, more particularly, to such improvements capable of being adapted for use as a reusable vacuum cleaner bag or pre-filter dust bag for use in a wet/dry vacuum cleaner, or the filter improvements capable of being adapted for use as a furnace filter or automobile cabin filter.

2. Description of the Related Art

As shown, taught and described in related application U.S. Ser. No. 12/818,457, incorporated by reference herein as if rewritten in its entirety, a pre-filter cloth was found to improve the use of a wet/dry vacuum cleaner. Formed as a generally rectangular envelope formed of a polyester woven or nonwoven felt having a weight of between 3-16 oz., the envelope was found to provide an improved pre-filter membrane as adapted for use with an otherwise conventional ShopVac®, Craftsman™, Rigid® or other similar style wet or dry vacuum for all types of debris. The use of such a prefilter dust collection member has been found to improve the performance of such canister-type vacuum cleaners, as well as improve their adaptability by allowing for containment of hazardous debris, resiliency to moisture and other such improvements.

Consequently, the adaptation of such features and benefits to ordinary indoor vacuum cleaners or floor sweepers could result in similar improvements, as well as result in a multi-use and washable replacement otherwise conventional disposable paper cartridge filters. Other uses may included but are in no way limited to, furnace filter or automobile cabin filters.

SUMMARY OF THE INVENTION

It is therefore an object of the present invention to provide an improved reusable dust bag for use in conventional or wet/dry capable vacuum cleaners.

It is a feature of the present invention to provide a vacuum filter bag formed of washable or reusable nonwoven materials that can be emptied and washed.

Briefly described according to one preferred embodiment of the present invention, an aftermarket replacement vacuum bag is formed of a size, shape and configuration as to be an aftermarket replacement for a conventional, disposable paper type vacuum filter bags that are otherwise used with such conventional vacuum cleaners. However, the aftermarket replacement vacuum bag of the present invention is formed of a nonwoven cloth envelope formed of a polyester woven or non-woven felt having a weight of between 3-16 oz. The nonwoven cloth envelope is further constructed to include an open end that is releasable closed, preferably with a slip clamp type of fastener arrangement that seals the open end during use, but allows the opening to permit egress of collected contents.

In accordance with a preferred embodiment, the use of various densities and materials of cloth can accommodate different working conditions, such as, for example, a light weight non-woven and/or woven polyester fabric for normal applications, a denser non-woven and/or woven polyester fabric for high particulate environments, or a micro felt or duo density for super high efficiency in removing fine particulates such as drywall dust or in hazardous material applications.

In addition to effective use with large or small particulates, the present invention can further be used in conjunction with liquids or in high-humidity applications.

An advantage of the present invention is that the fabric nonwoven and/or woven material generates a static attraction to collected dirt and particulates, which allows the filtered media or particulate to 'stick' to the fabric's fibers rather than 'plugging' the pores between.

Another advantage of the present invention is that it can be emptied and cleaned, allowing for reuse in a number of applications.

Further, a preferred embodiment of the present invention has a sealing means that can allow for use in conjunction with cleanup activities, followed by sealing to allow for the contents to be safely and properly discarded. Such improvements anticipated herein prevent contamination of the vacuum canister itself with its built-in sealing means on the inlet side of the bag.

Another embodiment of the present invention has retention means that allow for a ring and rod cylindrical cage to fit inside the commercially available vacuum, where it is mounted and hangs from existing filter mounts. The ring and rod cage may be mounted by tie rope or a threaded clamp. The purpose of this ring and rod cage is to hold the shape of the woven or nonwoven filter. Such improvements anticipated herein provide a larger filter area for the vacuum, which is especially helpful from commercial devices.

An additional embodiment of the present invention provides a filter designed for filtering particulate and other media. This filter frame is made of a metal or plastic skeleton. The filter itself is made of a nonwoven polyester. The secondary purpose of this filter is to prevent the use of a secondary bag to capture debris, particulate, and other media by protecting or extending the life of the main filter.

Another embodiment provides for the nonwoven material injected with carbon black to be a filter used in as a furnace filter or an automobile cabin filter. The infusion of carbon black into the nonwoven material gives the infused material epitropic properties. This allows for a healthier filter as the epitropic properties cause the filter to be anti-bacterial.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7 is an exploded perspective view for the mounting plate of FIG. 6a;

FIG. 9c is a close up perspective view alternate embodiment of attaching the plastic insert 260.

FIG. 9d is a close up isometric view alternate embodiment of attaching the plastic insert 260.

DESCRIPTION OF THE PREFERRED EMBODIMENTS

In the following description, for purposes of explanation, numerous specific details are set forth in order to facilitate thoroughly understanding the methods, systems, and apparatus of a pre-filter dust bag dust membrane bag for use in a wet/dry vacuum cleaner and so on. It may be evident, however, that the methods, systems and so on can be practiced without these specific details. As used in this application, the term "nonwoven" or "nonwoven fabrics" are broadly defined as sheet or web structures bonded together by entangling fiber or filaments (and by perforating films) mechanically, thermally or chemically. They are generally flat, porous sheets that are made directly from separate fibers or from molten plastic or plastic film. They are not made by weaving or knitting and do not require converting the fibers to yarn. Nonwoven fabrics are engineered fabrics that may be a limited life, single-use fabric or a very durable fabric for long life multiple uses. Nonwoven fabrics provide specific functions such as absorbency, liquid repellency, resilience, stretch, softness, strength, flame retardancy, washability, cushioning, filtering, bacterial barrier and sterility. These properties are often combined to create fabrics suited for specific jobs, while achieving a good balance between product use-life and cost. They can mimic the appearance, texture and strength of a woven fabric and can be as bulky as the thickest paddings. In combination with other materials they provide a spectrum of products with diverse properties, and are used alone or as components of apparel, home furnishings, health care, engineering, industrial and consumer goods.

The best mode for carrying out the invention is presented in terms of its preferred embodiment, herein depicted within the FIGS. 1-14.

1. Detailed Description of the Figures

Figure 1B:
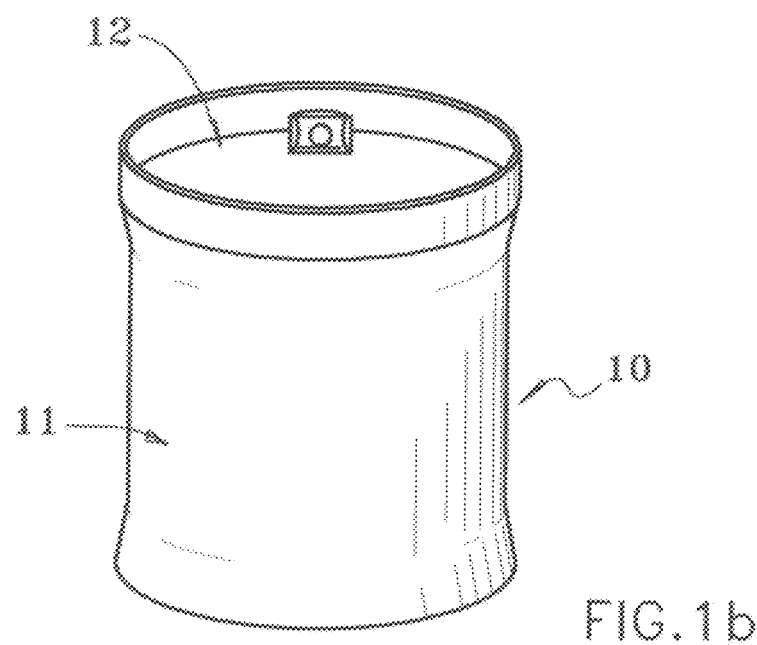
FIGS. 1a and 1b are perspective views of a canister type vacuum according to the PRIOR ART, shown as a ShopVac® Mode 92L625C, shown as an upper lid and lower canister, respectively.
Figure 1A:
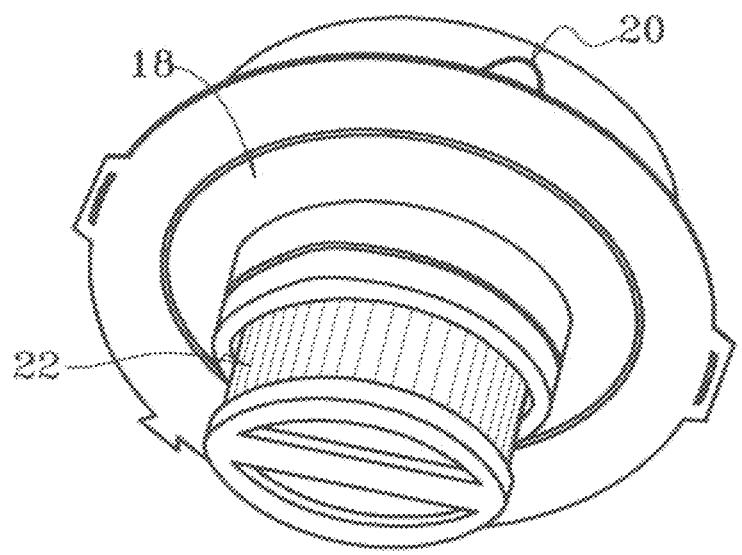
Figure 2:
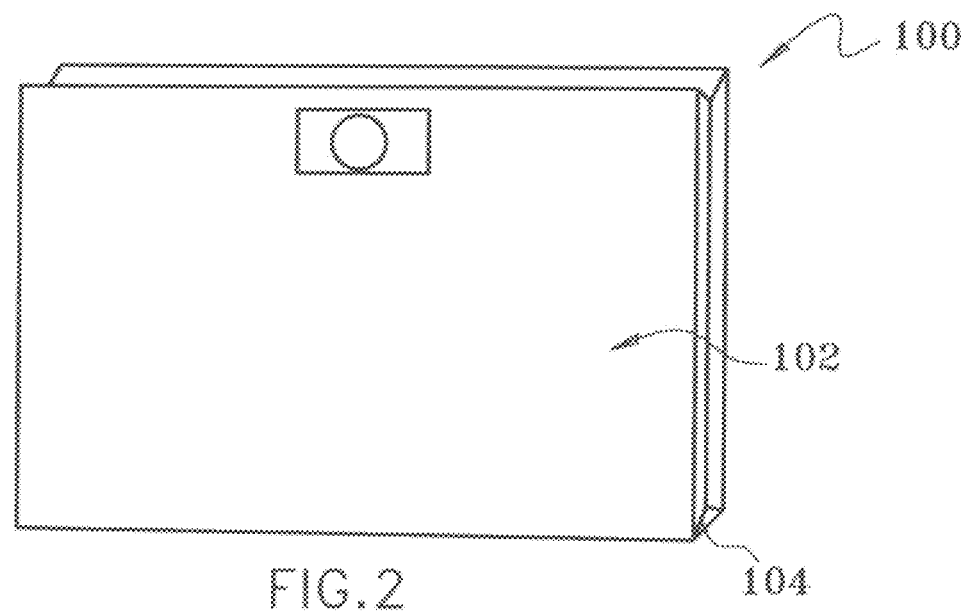
FIG. 2 is a front elevational view of a reusable aftermarket particulate collection member for otherwise conventional consumer floor vacuum cleaners according to the preferred embodiment of the present invention.
Figure 3:
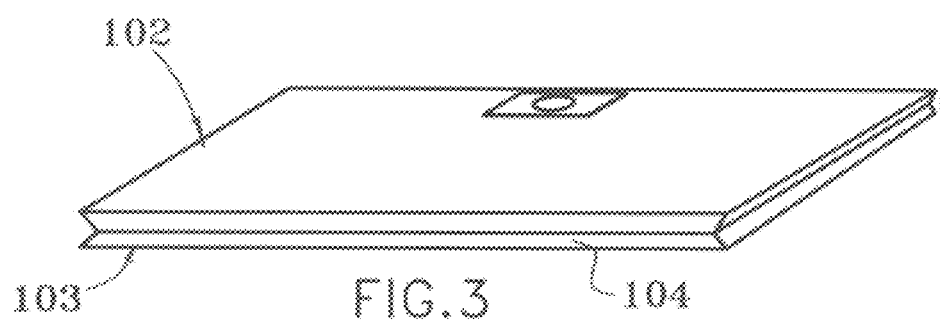
FIG. 3 is a perspective view thereof.
Figure 4:
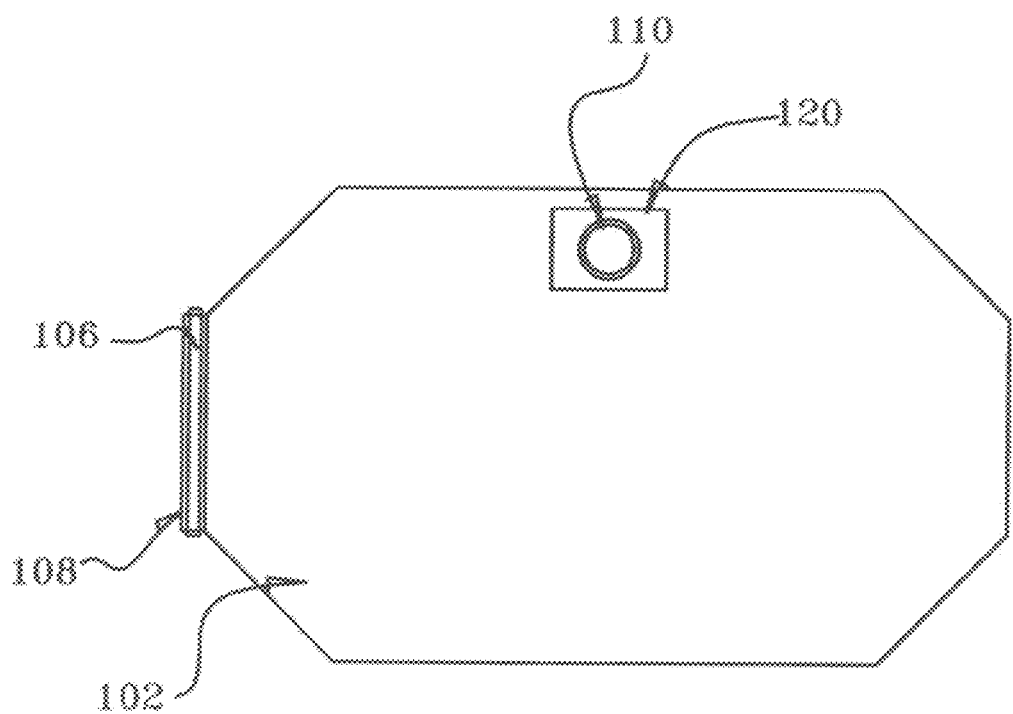
FIG. 4 is a top plan view of an alternate embodiment.
Figure 5:
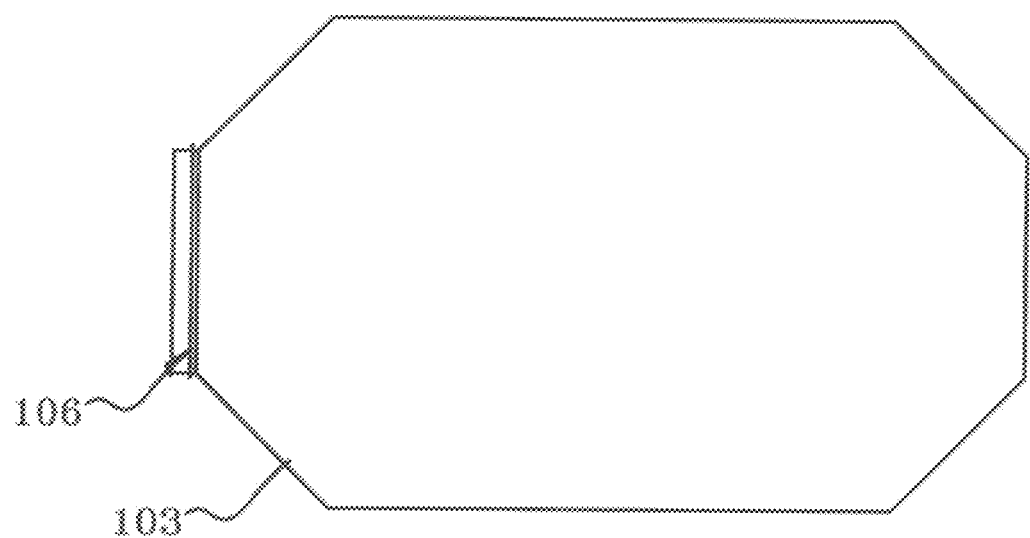
FIG. 5 is a bottom plan view of an alternate embodiment.

As shown in FIG. 1a-1b, a canister type vacuum, generally noted as 10 is shown according to the PRIOR ART. Such a vacuum 10 is shown as a ShopVac® Model 92L625C; however, as would be apparent to a person having ordinary skill in the relevant art, in conjunction with the present teachings and disclosures, the use of such a ShopVac® is shown for exemplary purposes and the present invention can be used in conjunction with any similar or equivalent type of canister type vacuum of various sizes, styles, models, or the like that would include a canister 11 forming a collection receiving chamber 12. A motor driven pump or fan 18 accessing the collection receiving chamber 12 is creates an air motive force for drawing fluid through an intake hose and out of a discharge portal 20. A filter medium, generally a paper cartridge element 22 is placed between the intake portal and the discharge portal 20 and forms the separation membrane to allow passage of fluid, usually air, and solid particulates carried within the fluid stream. The canister 12 then thereby collects the separated solids.

Referring to FIG. 2-5, an improved vacuum cleaner particulate collection member is provided according to the preferred embodiment of the present invention, for use generally in combination with the canister type vacuum, generally noted as 100. While the dust collection member 100 is shown formed as a generally rectangular envelope, such a configuration is shown merely for clarity and convenience only, and it should be understood that the dust collection member 100 is to be formed of a size, shape and configuration as to be an aftermarket replacement for a conventional, disposable paper type vacuum filter bags that are otherwise used with such conventional vacuum cleaners. However, instead of using filter paper material, the dust collection member 100 of the present invention is formed of a polyester non-woven and/or woven felt having a weight of between 3-16 oz.

As shown the dust collection member 100 forms two generally parallel planar sides, a first planar side 102 separated from a second planar side 103 by a pleated or other type of expandable edge construction 104 and includes an open end 106 that is releasable closed, preferably with a slip clamp fastener arrangement 108 that seals the open end 106 during use, but allows opening to permit egress of collected contents. One planar side 102 forms an entry portal 110 circumscribed by a rigid mounting plate 120 capable of allowing securement to the hose inlet connection.

Again, such a configuration is described for clarity, and it is intended that the vacuum bag is formed of a size, shape and configuration as to be an aftermarket replacement for a conventional, disposable paper type vacuum filter bags that are otherwise used with such conventional vacuum cleaners, but further adapted to allow opening to permit egress of collected contents.

Figure 6A:
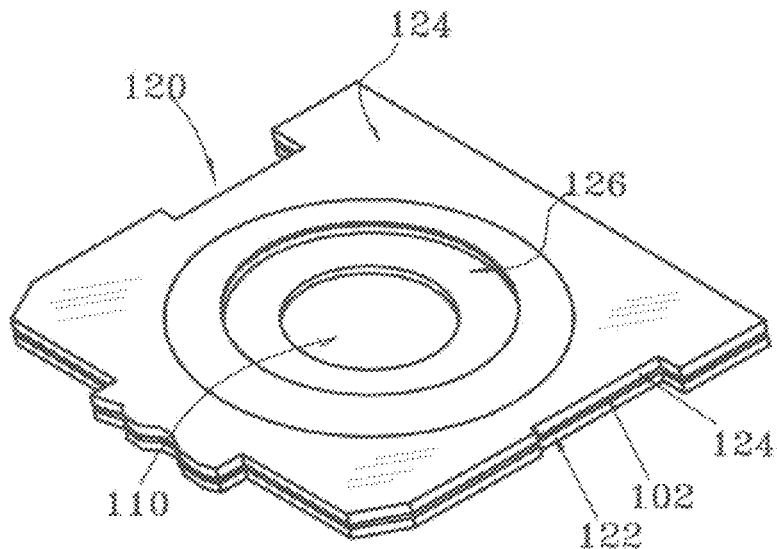
FIG. 6a is a perspective view of a rigid mounting plate 120 capable of allowing securement of the present invention to the hose inlet connection of a canister type vacuum according to the prior art.
Figure 6B:
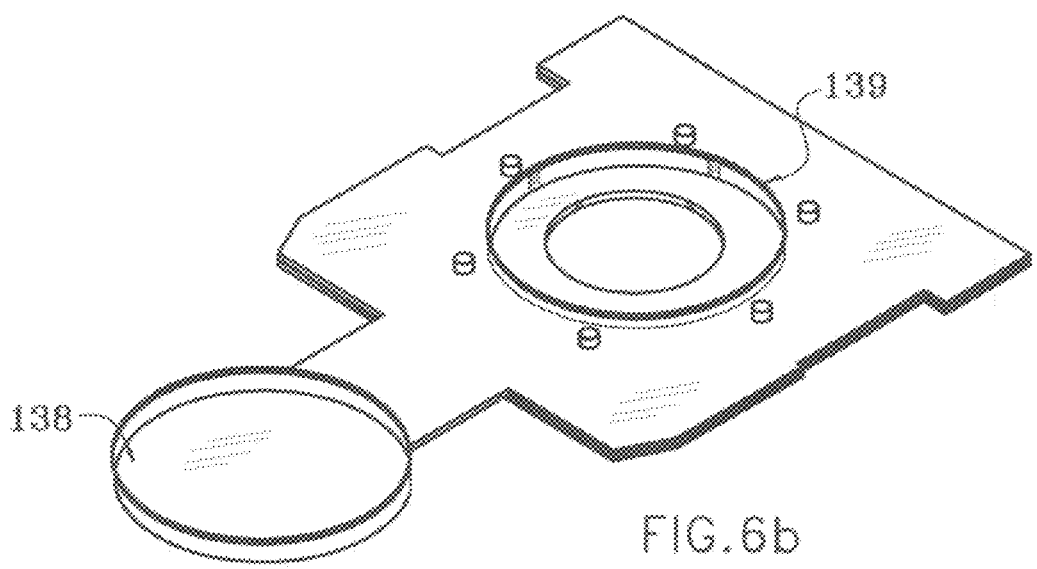
FIG. 6b is an alternate embodiment thereof.
Figure 8A:
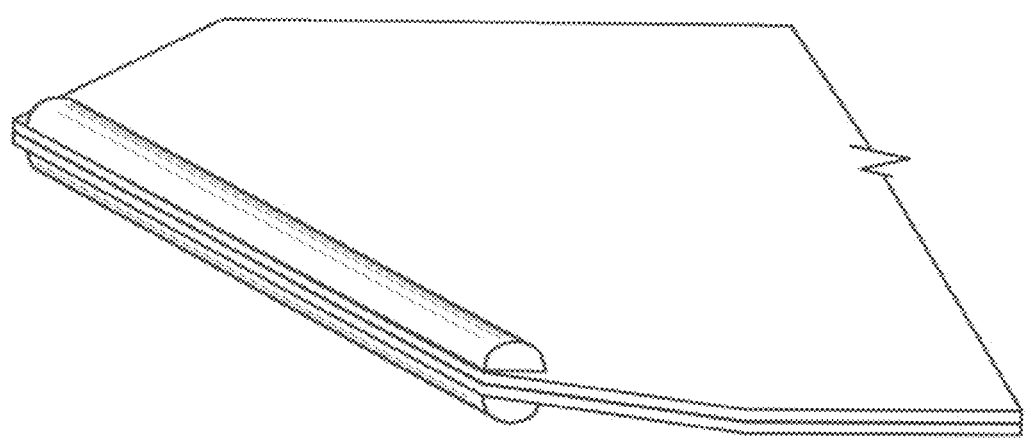
FIG. 8a is a close up view of the open end 106 of the pre-filter collection member according to the preferred embodiment of the present invention, shown sealed.
Figure 8B:
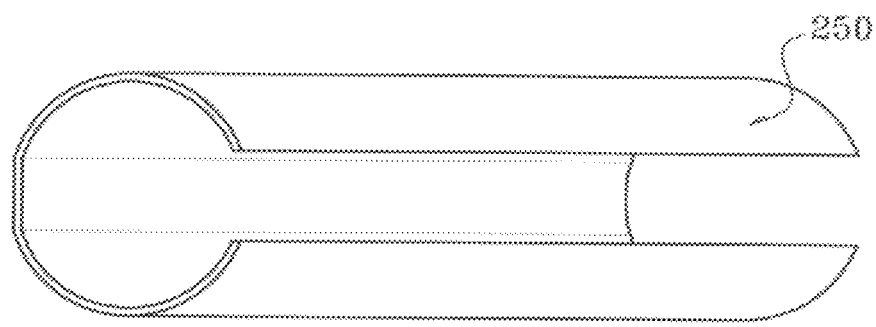
FIG. 8b is a perspective view of the slip clamp 250, shown unattached to the open end 106.
Figure 9A:
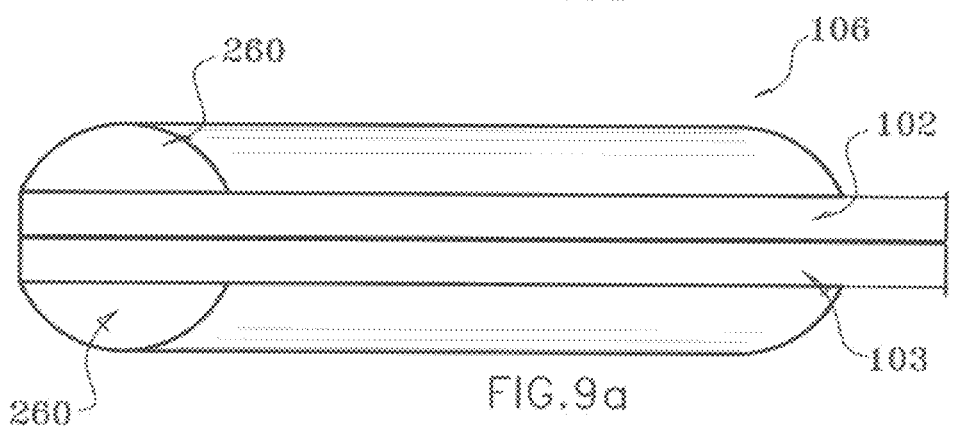
FIG. 9a is a close up view of the open end 106 of the pre-filter collection member according to the preferred embodiment of the present invention, showing the first planar side 102 and the second planar side 103 unsealed.
Figure 9B:
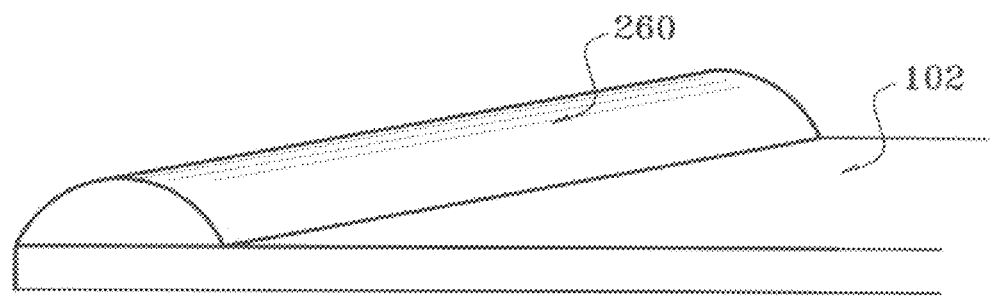
FIG. 9b is a close up isometric view of the first planar side 102 at the open end 106.
Figure 10:
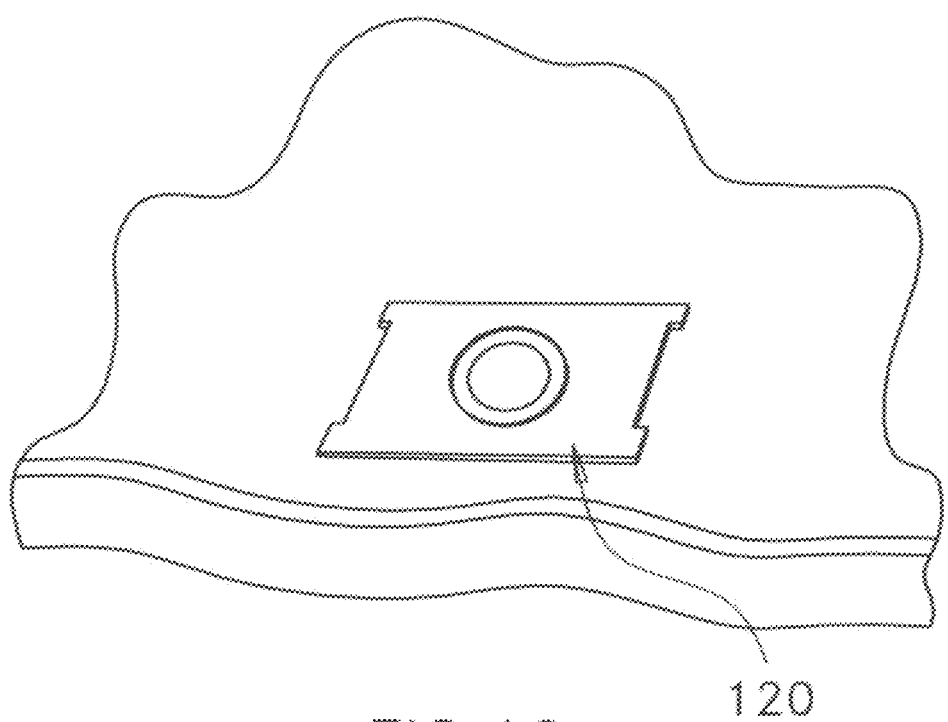
FIG. 10 is a close up detail of the rigid mounting plate 120 shown installed.

Referring in greater detail to FIG. 6-7, the mounting plate 120 is attached to the first planar side 102 circumscribing the entry portal 110 by impingement of a first plate element 122 to a second plate element 124 in a manner such that the first planar side 102 is sandwiched between the two and the woven and/or non-woven fabric. A sealable gasket 126 is also secured between the first plate element 122 and second plate element 124. The first plate element 122 forms a plurality of heat stakes 126 radially disposed about an entry portal access orifice 130. The gasket 126 further forms a similar number of alignment holes 136 corresponding to the number and location of the heat stakes 128. The second plate element 124 similarly forms holes 140 corresponding in number and location with, and designed to received the heat stakes 128. In an alternate embodiment, shown in FIG. 6b, a locking cap 138 is attached to the first plate element 122, and a protruding sealing ring 139 is formed about the access orifice 130 on the second plate element 124 such as to form a closeable connection there between. When the cap 138 is attached to mounting plate 120 after releasing the bag from the inlet 110, the contents are sealed to prevent dust and debris from escaping the bag.

In either embodiment, the first plate element 122 and second plate element 124 can be attached by any known methods in the art, such as adhesive, thermal bonding, ultrasonic bonding, sonic welding, cohesive melting, or the like. The attached and affixed mounting plate 120 can be attached to the mounting bracket inside of the vacuum canister. The mounting plate 120 is provided with an opening 110, through which air and entrained debris enter the bag 100 from the shop vacuum cleaner inlet (intake). The function of the mounting plate 120 is to facilitate the ease of bag installation and to securely hold the bag 100 to the vacuum inlet during vacuum operation.

The diameter of the opening 110 is preferably larger than the outside diameter of the shop vacuum cleaner inlet. The gasket 126 is then preferably larger than the outside diameter of the shop vacuum cleaner inlet, and thereby forms a sealing engagement thereto. This allows a tight fit of the mounting plate 120 on the vacuum cleaner inlet. Thus, it secures the mounting plate 120 on the vacuum cleaner inlet.

The mounting plate 120 is preferably made of a rigid material, such as a plastic material. It has been found that the use of cardboard is insufficient in structural rigidity.

The open end 106 is shown in greater detail in conjunction with FIGS. 8a-9d. A slip clamp fastener 250 is affixed laterally across one end with two half round plastic inserts 260 that are held together so as to create a seal by the slip clamp fastener 250. The Slip clamp 250 is a semi-circular tube sleeve that slides on the plastic inserts 260 to seal the bag. In this construction design the open end 106 can be placed together and sealed using the slip clamp fastener 250 to meet create a sealed seam to thereby seal the open end 106 in a manner that seals the open end during use, but allows opening to permit egress of collected contents. The plastic inserts 260 are affixed to the appropriate planar side by adhesive or by sewing the elements directly to the planar side.

The filter bag 100 itself is anticipated as being available in various sizes as well as different densities and materials of cloth to accommodate different working conditions. For example, a lightweight polyester fabric of between 3-12 oz. densities is anticipated for normal applications, while a denser polyester fabric, such as a 16 oz felt bag, would be more suited for high particulate environments. Further still, various kinds of super high efficiency material can be used in removing fine particulates or in hazardous material applications.

Figure 11:
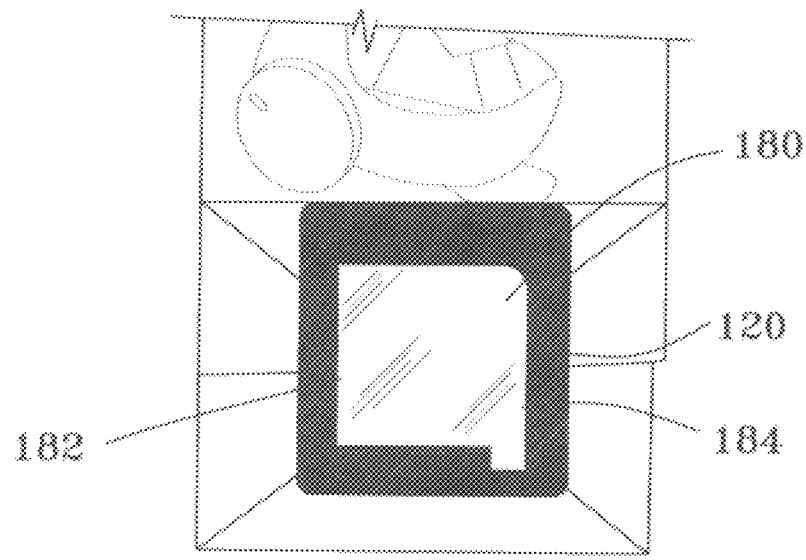
FIG. 11 is a close up detail of a first alternate sealing mechanism for use in accordance with the preferred embodiment of the present invention, shown sealed.
Figure 12:
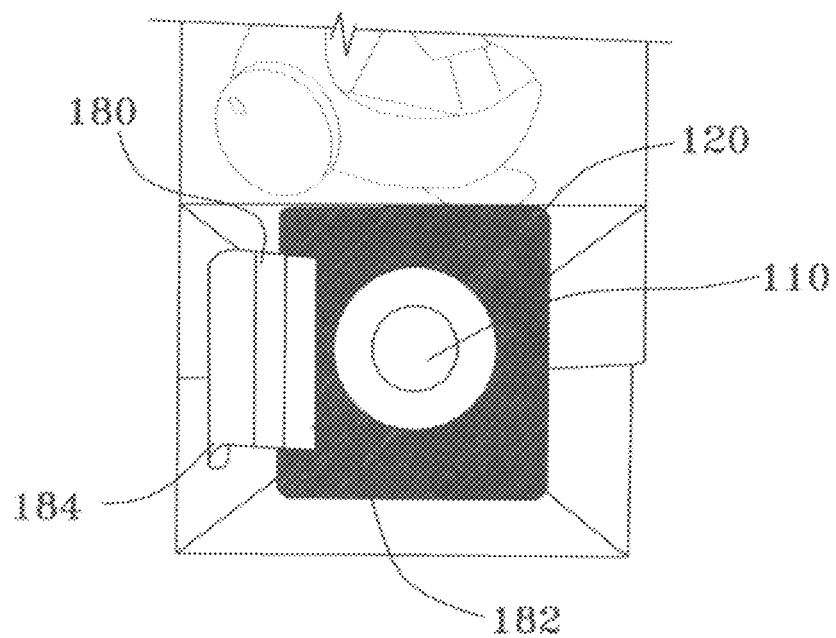
FIG. 12 is a close up detail of a first alternate sealing mechanism for use in accordance with the preferred embodiment of the present invention, shown unsealed.

As shown in FIG. 11-12, a first alternate sealing mechanism for use in accordance with the preferred embodiment of the present invention. In such an embodiment, the entry portal 110 is removably sealed by a flexible planar tape closure 180 that is permanently affixed along a connected edge 182 to the mounting plate 120. The entry portal 110 can thereby be covered, closed and sealed when the closure 180 is placed across the portal 100 and an unconnected edge 184 sealed to the mounting plate 120, thereby sealing the contents within.

Figure 13:
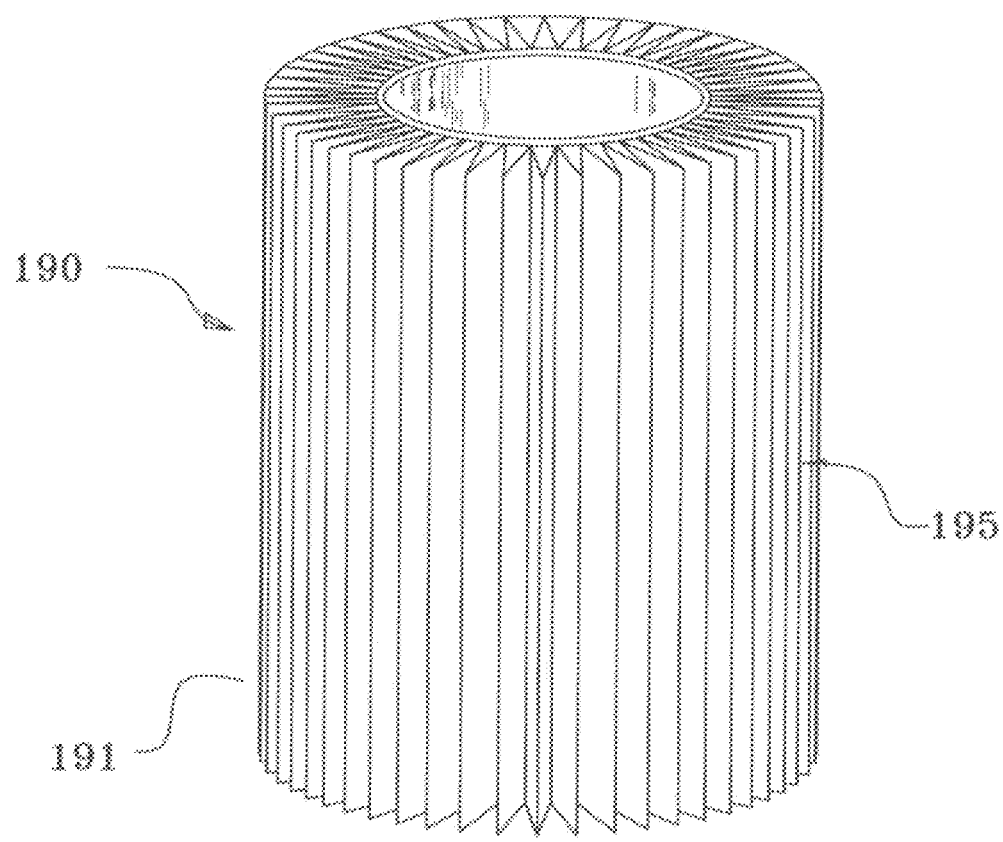
FIG. 13 is a perspective view of the pleated polyester filter supported by a metal or plastic skeleton or frame.

Referring to FIG. 13, an improved vacuum cleaner filter is provided according to a first alternate embodiment of the present invention, for use generally in combination with the canister type vacuum, generally noted as 10. Said Filter 190 is in constructed from a hollow cylindrical metal or plastic skeleton 191 and a pleated nonwoven polyester 195 material which acts as the filtering device. The pleated nonwoven polyester 195 material is attached or affixed to the metal or plastic skeleton 191 along at the top and bottom of the metal or plastic skeleton.

Figure 14:
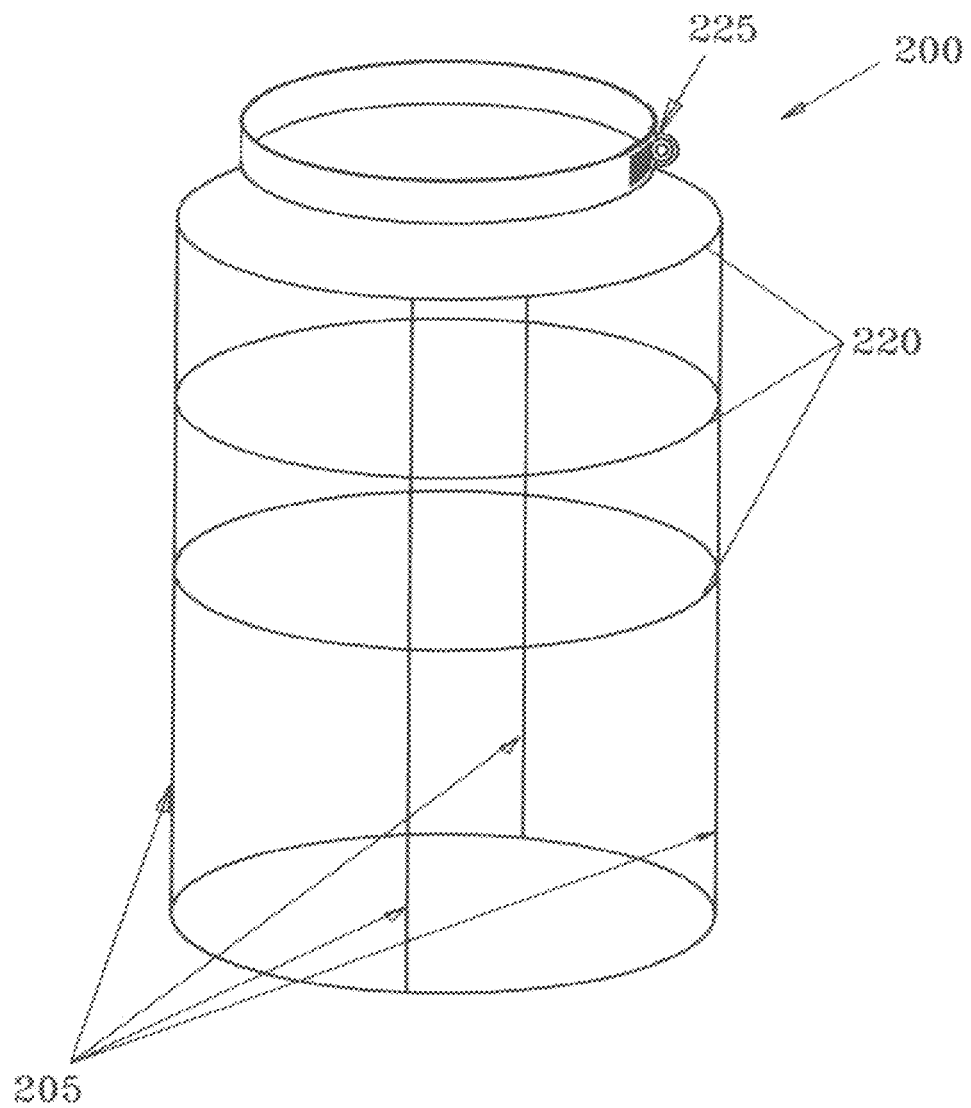
FIG. 14 is a perspective view of the Ring and Rod Cage used to hold the shape of a filter.

Referring to FIG. 14, an improved vacuum cleaner ring and rod cage 200 used to hold the shape of a filter is provided according to a second alternate preferred embodiment of the present invention, for use generally in combination with the canister type vacuum, generally noted as 100. The ring and rod cage 200 is approximately 14" high and 8.5" in diameter. This ring and rod cage 200 fits inside a vacuum cleaner and provides a larger filter area than what is currently commercially available.

The rod and cage 200 is laterally supported by support rings 220 spaced evenly apart along the vertical axis of ring and rod cage 200. The ring and rod cage is vertically supported by at least three vertical support rods 205. All vertical support rods 205 are connected to the bottom and top support rings.

The rod and cage 200 is removable from the vacuum cleaner. It connects to the vacuum cleaner in a way such that it may be easy detached, like snap buttons, a retaining clip, or a draw string.

Additional to providing structural support, the support rings 220 also provide a connection point to the filter through which a filter is attached connected or affixed, usually through sewing, to the support rings.

The filter that attaches to the rod and ring cage has an attachment device 225 at the top of said filter. The attachment device 225 is used for attaching the filter bag to the vacuum.

Figure 15A:
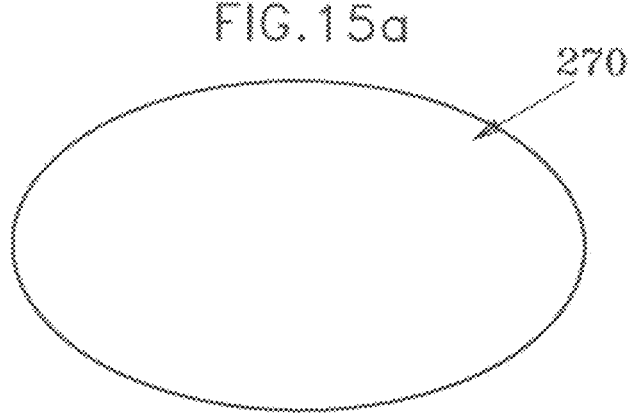
FIG. 15 is a plan view of flat round disc 270.
Figure 15B:
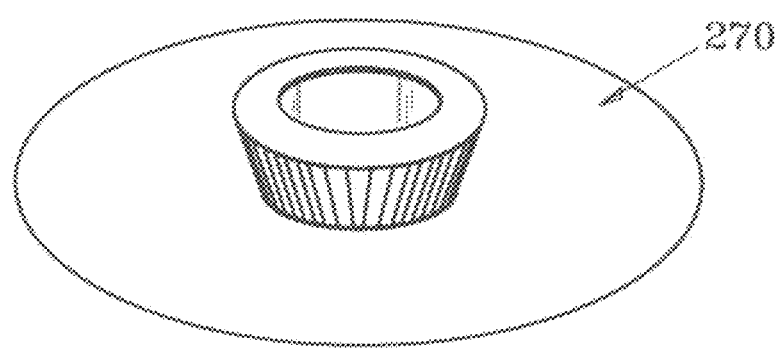
Figure 15C:
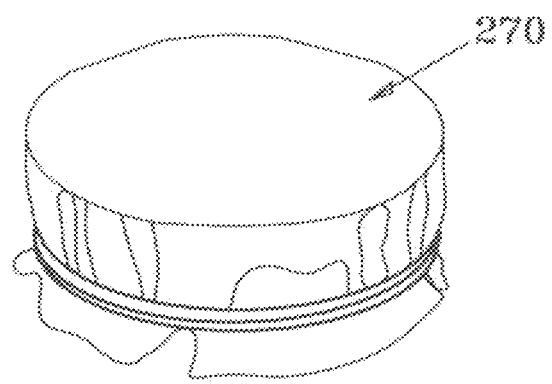

A flat round disc 270 is shown in FIG. 15. The flat round disc is made from the nonwoven material. The flat round disc 270 covers a standard commercial vacuum filter.

2. Operation of the Preferred Embodiment

To use the present invention in accordance with a preferred embodiment of the present invention, the user first removes the vacuum motor lid assembly from the shop vacuum cleaner and inserts a pre-filter particulate collection member according to the preferred embodiment of the present invention into the tank, wrapping the length of the envelope about the outer sidewall of the vacuum motor lid assembly is then mounted back.

During a vacuum operation, the motor of the shop vacuum cleaner removing air from the interior of the tank, creating a pressure drop (vacuum) within the tank. Air and entrained debris are drawn into the through the hose, and inlet, through the pre-filter collection membrane and into the tank. Particulates are collected inside the bag, with fluid (air) permeating through the envelope sidewalls. When the bag is full, the user removes the vacuum motor lid assembly from the shop vacuum cleaner and removes the bag from the tank. The bag can then be disposed, or emptied, washed out (cleaned if desired) and reused.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A reusable aftermarket particulate collection member for use with a vacuum cleaner, comprising:
   a filter adapted to be an aftermarket replacement for a disposable vacuum filter that are used with such vacuum cleaners, and further forming an open end, said filter formed of a pleated polyester woven and/or nonwoven fabric;
   a frame or skeleton of the filter;
   a particulate collection member in the form of a filter bag formed of a woven and/or nonwoven fabric adapted to prevent the use of a secondary bag that may also be suitable for containing hazardous materials;
   a detachable fastener arrangement for sealing said open end during use, but for allowing opening to permit egress of collected contents;
   an entry portal formed within a sidewall of said collection member and comprising a mounting plate;
   a frame made up of a ring and rod configuration;
   a filter that is sewn or otherwise attached to the ring and rod configuration;
   wherein said mounting plate comprises:
   a first plate element;
   a second plate element, wherein said first plate element forms a plurality of heat stakes radially disposed about an entry portal access orifice that corresponds in number and location with holes formed by said second plate element for receiving the heat stakes;
   a sealable gasket;
   wherein said first planar side is impinged between said first plate element and said second plate element, with said sealable gasket further sandwiched there between that and the woven and/or nonwoven fabric, thereby forming a connection of said mounting plate to said first planar side.

2. The particulate collection member of claim 1, said filter bag is formed of a lightweight polyester fabric of between 3-16 oz. densities.

3. The particulate collection member of claim 1, said filter bag is formed of micro felt super high efficiency material.

4. The particulate collection member of claim 1 wherein said mounting plate further comprises a sealable cap for closing said entry portal.

5. The particulate collection member of claim 1, wherein said mounting plate further comprises flexible planar tape closure that is affixable to said mounting plate and about said entry portal for closing said entry portal.

6. The particulate collection member of claim 3, wherein said flexible planar tape comprises:
   a connected edge for securing said one side of said flexible planar tape to said mounting plate; and
   an unconnected edge for removably sealed to said mounting plate.

* * * * *

UNITED STATES PATENT AND TRADEMARK OFFICE
CERTIFICATE OF CORRECTION

PATENT NO. : 8,956,432 B2  
APPLICATION NO. : 13/340975  
DATED : February 17, 2015  
INVENTOR(S) : Herndon et al.

It is certified that error appears in the above-identified patent and that said Letters Patent is hereby corrected as shown below:

In the Specification

In Column 3, line 47, please replace the line
"term "nonwoven" or "nonwoven fabrics" are broadly defined"
with
--term "woven" or "nonwoven fabrics" are broadly defined--

In Column 4, line 3, please replace the line
"FIGS. 1-14."
with
--FIGS. 1-15.--

In Column 6, line 36, please replace the line
"disc is made from the nonwoven material. The flat round disc"
with
--disc is made from the woven or nonwoven material. The flat round disc--

Signed and Sealed this
Seventh Day of July, 2015

Michelle K. Lee
*Director of the United States Patent and Trademark Office*